United States Patent [19]

Söderlind

[11] Patent Number: 5,525,101

[45] Date of Patent: Jun. 11, 1996

[54] BONE REMOVING DEVICE

[76] Inventor: Jan Söderlind, Smålandsvägen 41, S-186 35, Vallentuna, Sweden

[21] Appl. No.: 424,474

[22] PCT Filed: Nov. 10, 1993

[86] PCT No.: PCT/SE93/00955

§ 371 Date: Jun. 26, 1995

§ 102(e) Date: Jun. 26, 1995

[87] PCT Pub. No.: WO94/10848

PCT Pub. Date: May 26, 1994

[30] Foreign Application Priority Data

Nov. 10, 1992 [SE] Sweden ............... 9203354-7
Oct. 7, 1993 [SE] Sweden ............... 9203285-2

[51] Int. Cl.⁶ ............... A22C 25/16
[52] U.S. Cl. ............... 452/135; 452/83
[58] Field of Search ............... 452/135, 137, 452/138, 139, 133, 85, 83

[56] References Cited

U.S. PATENT DOCUMENTS 3,911,530 10/1975 Kalfsbeek et al. ............... 452/83
4,631,780 12/1986 Leining ............... 452/133
5,135,430 8/1992 Jordan ............... 452/83

FOREIGN PATENT DOCUMENTS 2641427 5/1977 Germany .
467904 10/1992 Sweden .
92/12641 8/1992 WIPO ............... 452/135
94/10848 5/1994 WIPO ............... 452/135

Primary Examiner—Willis Little
Attorney, Agent, or Firm—Bacon & Thomas

[57] ABSTRACT

The invention relates to a device for removing fish bones from hist meat, or quills from killed poultry, comprising a cylinder provided with gripping means shaped as holes, a counter pressure element for achieving a squeezing function between the counter pressure element and the cylinder. The cylinder is mounted axially on the driving shaft for driving the cylinder. The cylinder is uncovered, i.e., it is not contained in any apparatus housing. The counter pressure element is designed with a lip, bearing against the rotatably driven element 22, at least by means of an edge. The invention further relates to a cylinder for a device of the above described type, which is provided with a plurality of recesses running across its envelope surface, substantially in its longitudinal direction. The recesses have at least one sharp edge formed along the joining line between the envelope surface and the inner surface of the recess. The invention also relates to a device incorporating the improved cylinder.

11 Claims, 6 Drawing Sheets

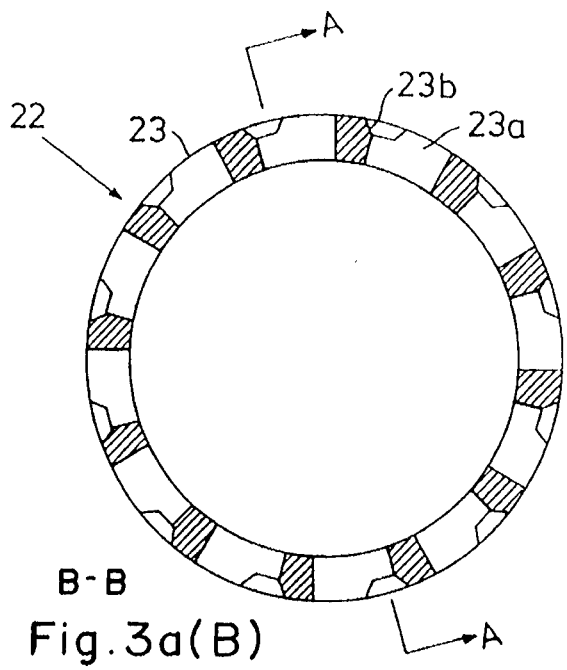
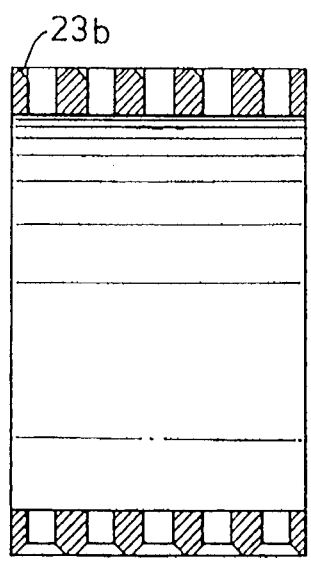
Fig. 3a(B)
Fig. 3a(A)
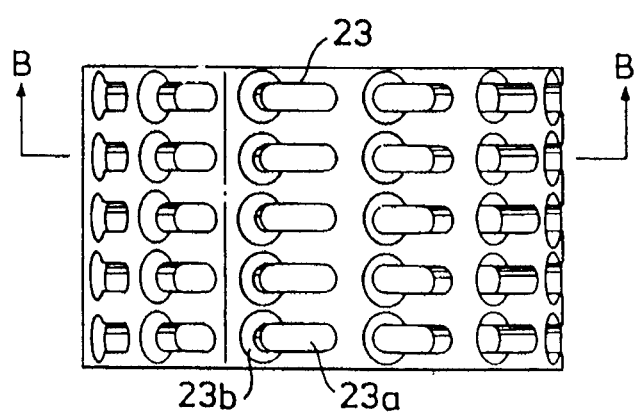
Fig. 3a(C)
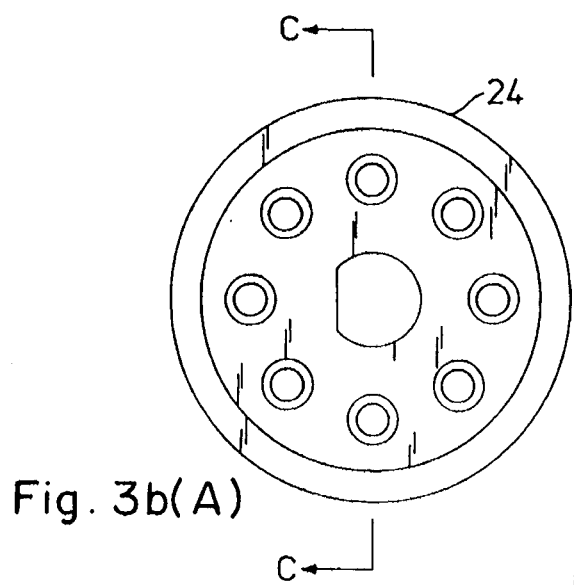
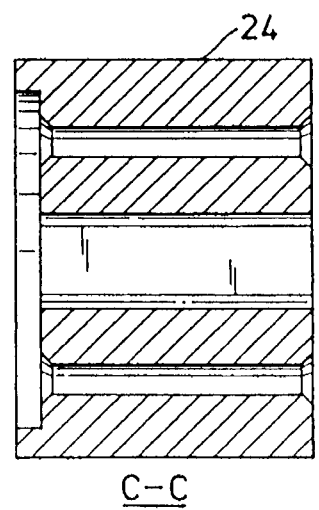
Fig. 3b(A)
Fig. 3b(B)

BONE REMOVING DEVICE

This application is a 371 of PCT/SE93/00955 filed Oct. 10, 1993, now WO 94/10848, published May 26, 1994.

The present invention relates to a device for removing bones from meat, noteably from fish and in particular it relates to removing so called pin bones or belly bones from fish meat, e.g. from divided fresh or smoked fish filets.

PRIOR ART

A device of the above mentioned type is previously known from the Swedish patent with the publication number SE-467904.

This known device comprises a housing in which a rotateable, cylindrical element is provided. The housing has an opening which exposes part of the envelope surface of the cylinder. The cylinder which is provided with a plurality of holes for receiving fish bones to be removed, is rotated in the housing, and when the device is moved across the surface of a fish filet, fish bones will be caught in the holes in the cylinder. Additionally there is a counter-pressure device in the shape of a tounge or lip, which is arranged adjacent the surface of the cylinder, and forms a narrow gap between the tounge and the cylinder surface, but which has the ability to yield further to some extent. In this gap the fish bone is squeezed and moved into the housing, where a vacuum suction device conveys the bone further away to a collecting receptacle.

Although this known device represented a huge step forward within this technology, it has shown to suffer from a number of disadvantages.

First of all the machine is provided with a housing, which is necessary to contain the angular gear required for the cylinder to be operated according to desire. This housing is manufactured of metal, which makes the total weight of the machine high. In addition it is a very complicated process to work the housing to the desired structure. It is in fact not possible (at a reasonable cost) to mold or in any other way shape the housing. Due to the complicated manufacture the cost of manufacture for the housing becomes very high.

Another functional drawback, which is a direct consequence of the housing, is that during use of the machine, i.e. when the machine is moved forward across a fish filet, it obscures the point where the bones are picked up, which makes it more difficult for the operator to correctly catch the bones. A still more serious problem thereby is that the bones very easily are flattened or bent down by the front edge of the housing, which has as a consequence that the bones easily evades being caught, and that the operator must try again. Thereby it may happen that the operator must press the machine down against the filet, whereby the meat may be damaged to some extent, with a less appealing appearance as a consequence.

Due to its complicated construction with many nooks and corners that are difficult to get access to it is relatively timeconsuming and cumbersome to clean the housing. In addition the housing must be dismounted for the purpose of cleaning. Furthermore, certain cleaning equipment is required, such as brushes and other tools, in order to achieve effective cleansing.

Another problem is that the fishbones, once they have been caught by the machine, are conveyed along the periferi of the cylinder and enters the interior of the housing, where they must change direction before they are sucked out. This may lead to that the bones get stuck inside the housing and in gradually block the exit, which leads to an operation interruption.

A detail that raises the price of the known machine further is the construction of the cylinder. It is milled from one piece of solid metal to the desired shape, i.e. a cylinder with one closed side wall. This is costly both because of the material consumption and the time necessary for milling.

SUMMARY OF THE INVENTION

The present invention is an improvement of the above discussed device, and is defined in claim 1.

It comprises a rotatable element of cylindrical shape, mounted axially on the outgoing shaft of a driving unit, such as an electrical, pneumatic or hydraulic motor. The cylinder, which in one embodiment is provided with a plurality of holes for receiving e.g. pin-bones to be removed, is rotated, and when the apparatus is moved across the surface of a fish fillet, bones will be caught by the holes in the cylinder, and 'squeezed' in the nip between the cylinder and an element in the form of a tounge or a lip, which is in slight pressure contact with the cylinder surface. This tongue or lip is slightly resilient to accommodate the bones therebetween.

By arranging the rotating element uncovered according to said application (within the scope of the invention, "uncovered" means that the cylinder is mounted without a surrounding housing), the problem with bending and flattening of the bones when the machine is moved forward during operation, is eliminated.

The axial drive according to the invention additionally contributes to an improvement of the ergonomy during work, in that the arm with which the operator holds the machine does not have to be positioned with the elbow elevated, which is the case with the previously known machine.

The absence of an apparatus housing, with accompanying substantial reduction weight, also makes the work less heavy for the operator.

The bones that have been taken out from the fillet are removed from the area adjacent the cylinder by sucking away with the aid of a vacuum device.

The device according to the invention functions satisfactorily for most applications, except for removing bones from cod, haddock, pollack and the like. Furthermore, productivity in terms of the number of fillets that can be processed per time unit is however not optimal, and thus there is a need for improvment in that respect. It has also shown in practice that the suction tubing very easily may become packed with meat residues, that inevitably will be left on the bones, when the mentioned types of fish are treated. Because the vacuum will remove much of the liquid in the meat residues, the proteins in said residues will become 'cemented' to a very hard 'cake', which only with great difficulty can be removed from the tubing. Also the surface of the cylinder may become coated with such dried, cemented proteins, and as a consequence the cylinder will act more or less as a sand paper, having deteriorating effects on the surface of the fillets.

The process of cleaning the equipment leads to down-time with accompanying adverse effects on productivity and thus on economy.

It may also happen that the holes in the cylinder surface necessarily must miss some bones that encounter the cylinder between two holes. Therefor the pattern of holes must be laid out in an 'overlapping' fashion. However, despite the 'overlapping' there will still be a risk that some bones may not be caught by the succesive 'overlapping' hole, and therefor the operator may have to repeat the process. This of course may be unduly time consuming.

Thus, in a further aspect of the invention there is provided an improved cylinder for a fishbone picker, defined in claim 9.

Thus, the cylinder is provided with a plurality of recesses running across its envelope surface, substantially in its longitudinal direction, said recesses having at least one sharp edge along the joining line between the envelope surface and the inner surface of the recess.

In a preferred embodiment of the cylinder there is a step-like formation provided along at least one of its edges, joining said envelope surface, thereby creating two sharp edges. This gives a better grip of the bone and increases efficiency.

In still another preferred improvement of the known device, means for washing away bones and residues with water is used for the removal of bones and other residues from the apparatus instead of the vacuum suction of the prior art device.

This is considerably more efficient, and gives better general performance in that the water acts as a lubrcant and prevents proteins from building up a coating on the surface of the cylinder.

In the following a detail description of an embodiment of the invention will be given with reference to the appended drawings, in which FIG. 1 is a perspective view of a prior art device according to SE-467 904;

FIG. 2 shows the pin bone remover according to the invention in a perspective view from above;

FIGS. 3a and b show the construction of the cylinder in detail;

FIGS. 4a–c show the construction of the tounge in detail;

Figure 1A:
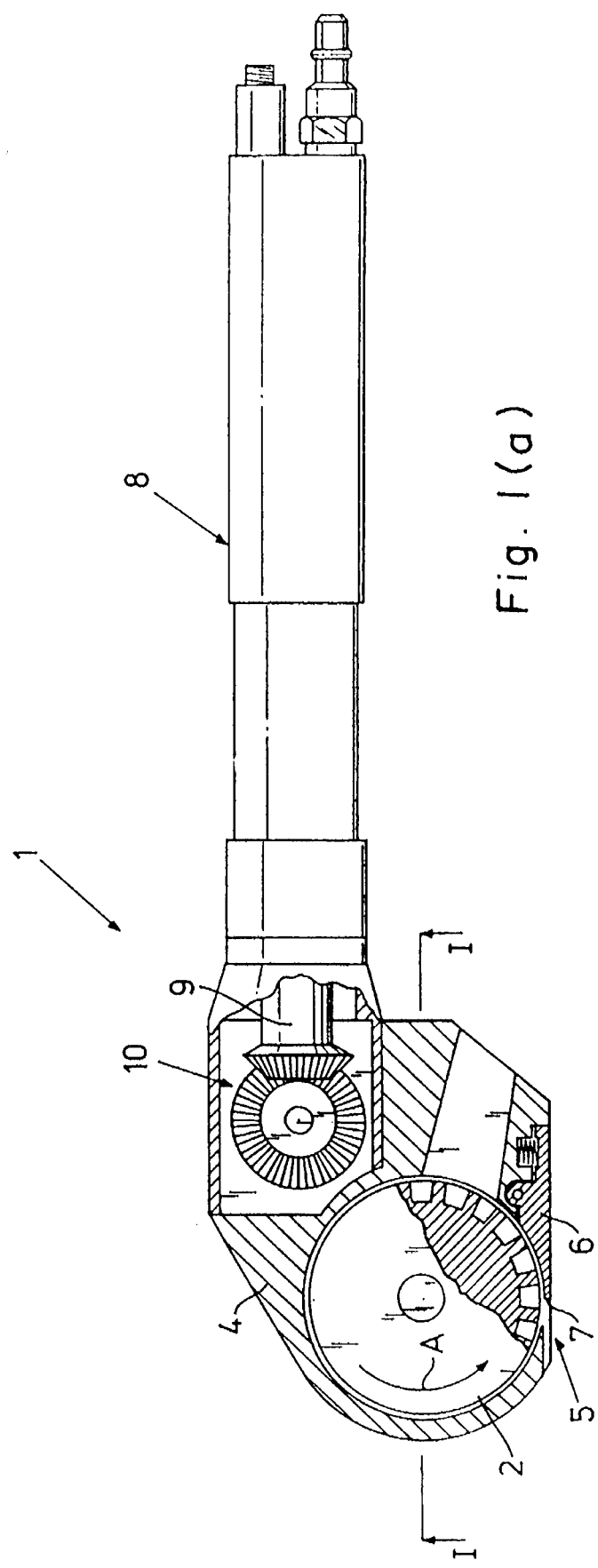
Figure 1B:
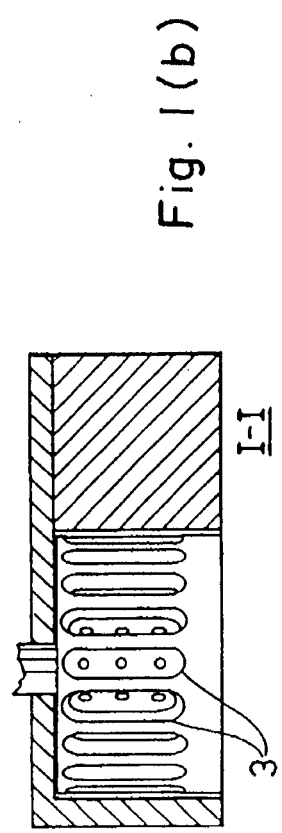

A pin bone remover 1 according to SE-467904, comprises a cylinder 2, the envelope surface of which is provided with radial bores 3. The cylinder 2 is rotateably supported/carried in a bearing in a housing 4. The housing 4 is provided with an opening 5, in which the cylinder 2 with its bores 3 is exposed. At one edge of the opening 5, there is a resilient counterpressure element 6, arranged adjacent the surface of the cylinder 2, and the free edge 7 which forms a gap between itself and the holes, said gap amounting to about 0,1–0,2 mm, but by resilient action can amount to about 0,3–0,4 mm in its maximum position.

A tube shaped handle 8 contains an air driven rotation motor and a reduction gear. The shaft 9 of the reduction gear transmitts the rotational movement to the cylinder 2 via an angular gear 10 provided in the housing 5.

Figure 2:
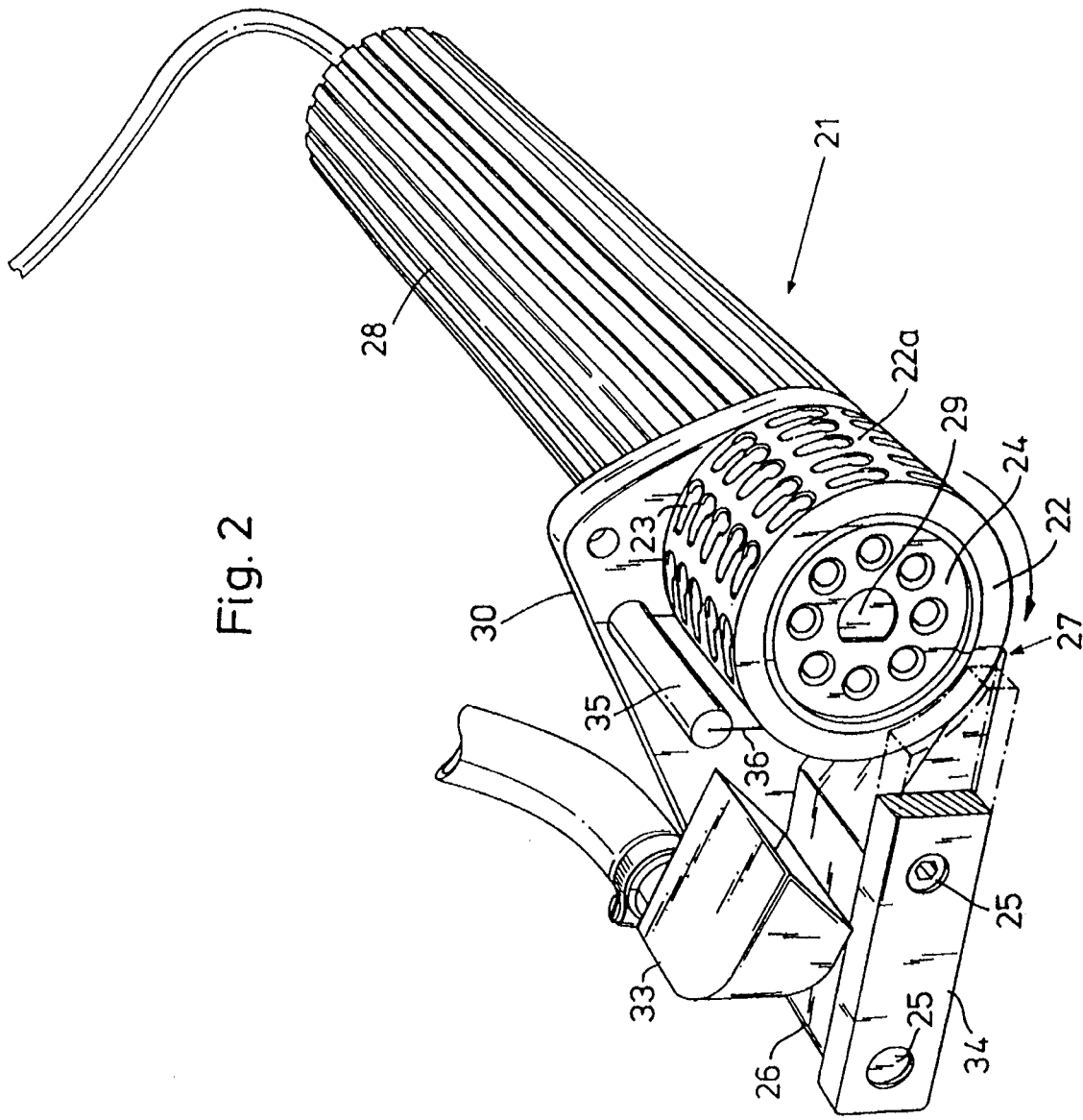

As can be seen from FIG. 2 the pin bone remover 21 according to the invention, it has in principle the same design as the known apparatus, with a handle 28, in which preferably an electric motor (not shown) is provided. A rotating element 22 in the form of a cylinder 22 provided with a number of holes 23, is mounted on the output shaft 29 from the motor. A suitable speed of rotation for the cylinder is 100–400 rpm. A mounting plate 30 is provided on the handle, and the driving shaft 29 runs in a bore through said mounting plate. A counter pressure element 26 is resiliently suspended on the mounting plate 30 (described in detail below), and bears against the envelope surface 22a of the cylinder 22. However, the device according to the invention lacks an apparatus housing, i.e. the cylinder 22 is completely uncovered. By arranging the cylinder 22 axially, directly on the driving shaft, i.e. it rotates in the same plane as the driving shaft (contrary to the previously known device where the cylinder rotates at right angles in relation to the driving shaft), and in that the apparatus lacks apparatus housing, three essential advantages are achieved:

1. The risk of a bone bending or flattening by the front edge of the housing has been completely eliminated.
2. The operator's view is not obscured by the housing in use, i.e. the operator can at all times watch what is happening during the picking of bones from the meat, which leads to that a number of "failed" attempts to pick a bone is substantially reduced and in practice eliminated.
3. The operator will have en ergonomically better operating position and because of the reduction in weight the work becomes less taxing.

Below the individual components will be described in detail.

The cylinder 22 in the pin bone remover according to the invention has been simplified in comparison with the cylinder of the known device. As mentioned initially the latter is manufactured by means of milling from a piece of solid metal. In order to order reduce the cost of manufacture and simplifying the manufacture the inventor has now realised that the cylinder simply can be manufactured from a steel tube, simply by cutting tubing to suitable dimension and to work the blanks in a suitable way. E.g. are holes 23 made in a particular pattern (described below). A cylindrical central piece 24 of a suitable plastic, e.g. DELRIN (trademark belonging to ACETAL) is formed with a sligthly smaller diameter than the inner diameter of the cylinder, and is pressed into the finished cylinder 22. The mounting of the cylinder/central piece 22/24 on the driving shaft, is done by means of a crescent-shaped pin (not shown) fitting in a hole in the central piece 24 shaped in a similar way, which effectively prevent inadvertent turning of the shaft 29 and makes it easy to mount and dismount the cylinder 22.

The design of the holes 23 has been improved in relation to the known device, and is shown in FIG. 3a. Thus, each hole 23 consists of an elongated, narrow recess 23a, which is created by milling, and in one edge of which a counterbore 23b has been milled, whereby a funnellike formation is created. This is of importance for the ability to pick up bones sticking up from the fish meat. Because the bones extending up from the fish meat does not all point in the same direction, there should be a "catching" or "guiding" means, guiding the bones into the holes 23a. As can be seen from FIG. 3a said funnellike counterbore will constitue exactly such a "catching means", in that the machine is moved in the The pattern in which the holes 23 are distributed is not particularly critical, but in order to achieve the best effect the holes 23 should be elongated, placed in line with each other, both along the circumference and cross the surface. The funnellike "guiding means" should be designed such that their contours practically touches each other.

The envelope surface 22a of the cylinder may be blasted, but this is not essential to the function.

The counter pressure element (or bottom plate) 26 in the device according to the invention, has been simplified substantially in several respects compared to the counter pressure element of the known device. It is necessary that said counter pressure device be somewhat resilient, i.e. that it yields a little when a bone passes between the surface of the cylinder 22 and the lip 27 of the counter pressure element. For achieving this spring action the counter pressure element is mounted on two pins 25a–b. These pins are screwed into a mounting plate 30, which is provided on the handle 28, between the handle and the cylinder, and through which the output driving shaft 29 from the motor runs. In one embodiment both pins can be provided with two recesses 31, in which O-rings 32 fits. These O-rings (conventional ones made of rubber, silicone or the like) have such properties that they allow the counter pressure element to spring somewhat both in the longitudinal direction of the counter pressure element 27, both also in the radial direction (with respect to the cylinder 22). However, it is prefered to provide one (the front) pin 25b with a tight fit, such that it functions as a pivot pin, and to provide only the rear pin 25a with said O-rings. Thereby the counter pressure element will turn around the front pin 25b when a bone is brought in between lip and cylinder. In principle one could reverse the pins 25a–b having the rear one as a pivot pin, but it has shown to function most satisfactorily with a front pivot pin. Of course one is not limited to the use of O-rings for achieving a resilient action, but a number of different possibilites are conceivable, e.g. a torsional spring in one pin, or a spiral pin arranged as has been shown in the previously known device. A locking pin (not shown) may be used to fix the counter pressure element 26 to the pins. Alternatively one can provide a locking plate 34 in front of the counter pressure element 26, and by means of a screw fix the whole assembly of pins, counter pressure element and locking plate in the mounting plate 30. By choosing a self-lubricating material in the locking plate 34, and letting it extend upto and slightly passed the front edge of the cylinder 22, one can also lock the cylinder 22 in place by means of said locking plate 34, which additionally contributes to a simplification of mounting and dismounting of the machine.

Figure 4A:
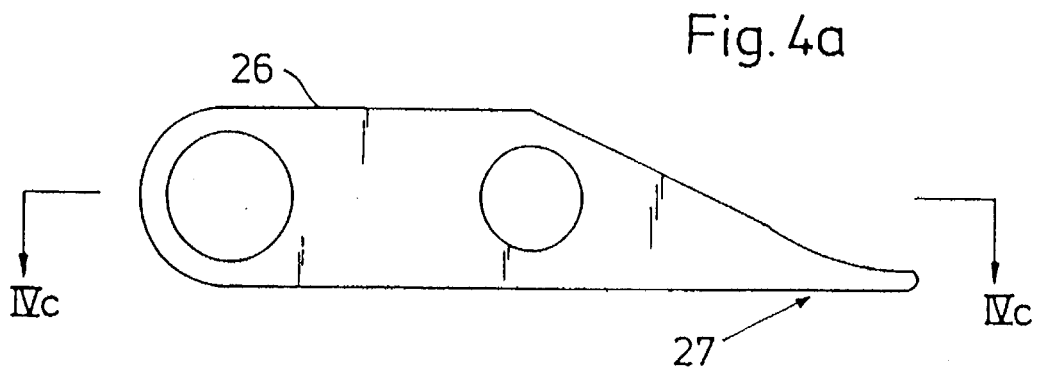
FIG. 4c shows the resilient mounting of the tounge.
Figure 4B:
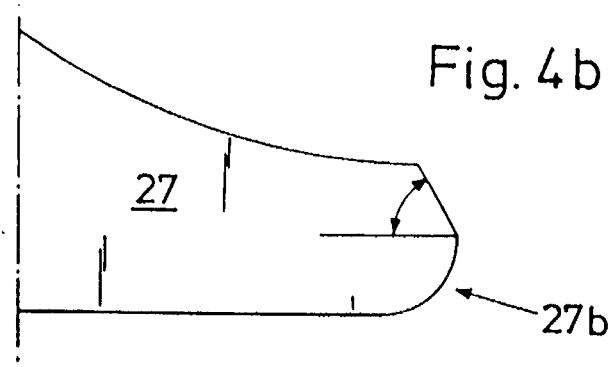
Figure 4C:
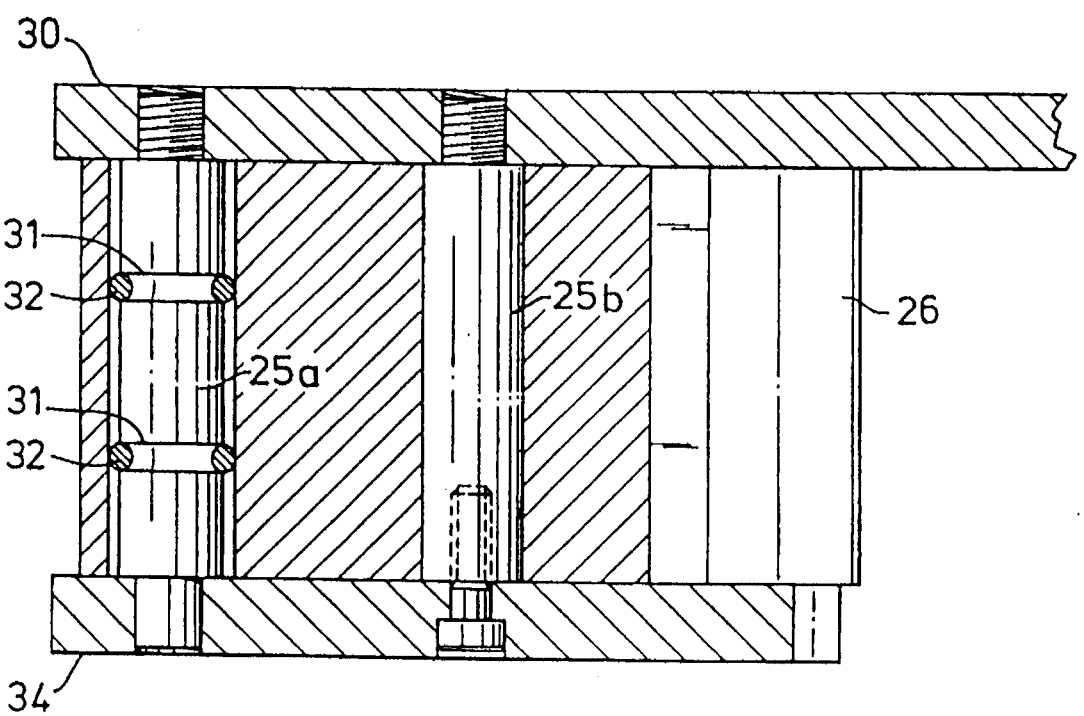

The lip 27 of the counter pressure element is further constructed in such a way that it exhibits a radius of curvature which is equal to or somewhat larger than the radius of curvature of the cylinder 22. Thereby the lip 27 will bear against the cylinder over a limited part of the extension of the lip, whereby the front edge 27b of the lip 27 exhibits the largest pressing force against the cylinder. This is preferred in order to achieve the required pulling force when a bone is squeezed between the counter pressure element 26 and the cylinder 22. The curvature of the surface 27a, of the lip, bearing against the cylinder 22 can have an extension along the surface of the cylinder 22 amounting to about 30° along the cylinder surface, but this angular measure is not critical but can be varied to some extent, e.g. depending on the type of fish and the size of bones. For most filets, i.e. in sizes ranging from 100 to 6000 g it is possible to use one and the same counter pressure element. A front edge 27b of the lip 27 is further constructed in a particular way, shown in a magnified detail view in FIG. 4b. The thickness of the front edge is about 0,75 mm in the preferred embodiment. The tip has been given a rounding with a diameter corresponding to said thickness. Furthermore the upper side of the front edge 27b has been bevelled at an angle of preferably 60° down to the center point of the thickness, i.e. to 0,375 mm. Thus the front edge 27b consists of an inclined, flat upper surface, and a rounded lower side. The bevelling is of importance for the ability of the machine to catch the fish bones when it is moved across the surface of a filet. A rounding on the lower side prevents the fish meat from being damaged when the machine is moved across its surface.

For conveying away removed bones there is a suction tube 33 arranged with its mouth adjacent the position where the bones exits the space between the cylinder 22 and the lip 27 of the counter pressure element 26 (FIG. 2). The suction tube is connected to a conventional vacuum equipment (suitable power about 0,5 kW) for achieving suction and will not be described further.

However, it should be noted that the device according to the present invention functions satisfactorily also without suction equipment, which is a difference compared to the previously known apparatus, which due to its apparatus housing must have a continuous and efficient removal of bones, in order to function. Without suction it would rather quickly become blocked by bones sticking.

On the mounting plate 30 there may be provided a scraping unit comprising a holder 35 and a scraping means 36 in the form of a thin plastic sheet (e.g. of DELRIN). This scraping means removes from the surface of the cylinder 22 residues of fish meat that may accompany the bones and get stuck on the surface.

In addition to removing pin bones and belly bones from fish the device can also be used for removing quills from killed turkeys, chickens, ducks etc.

In a modified variant where the counter pressure element has been eliminated and the cylinder 22 replaced by a set of spaced circular saw blades, the device may be used for scoring pork buttock, which today is carried out manually.

The new cylinder 40 for use with the known device, and shown in FIGS. 6–9, is provided with a plurality of recesses 41 running across the envelope surface 43 of the cylinder 40, substantially in the longitudinal direction of the cylinder. In a preferred embodiment the recesses form an angle with the longitudinal axis (see FIG. 6), preferably of around 18°.

By providing recesses extending across the entire cylinder surface, it is ensured that no bones will evade being caught in the nip between the cylinder and the tongue resting against the cylinder.

The provision of the recesses 41 at an angle (as in FIG. 6) results in the following advantage.

During operation the bones and meat residues that collect in the recess 41, will be transported towards the distal end of the cylinder 40, like in a screw conveyer, or extruder. Thus, there is very little material accumulated on the cylinder 40, and it is very easy to just rinse it away by dipping the cylinder end of the device in water.

If the recesses 41 were to be longitudinally parallell with the cylinder 40, the device would still function, but meat would get stuck in the recesses 41, with the need for frequent cleaning thereof.

Figure 7:
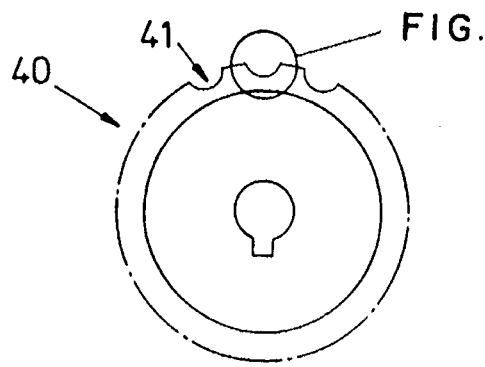
FIG. 7 is a side view of the cylinder according to the invention.
Figure 9:
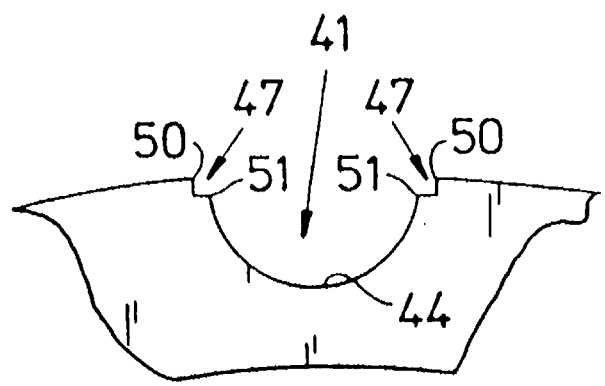
FIG. 9 is an enlarged view of another embodiment with steps on both edges of the recess.

As shown in FIG. 7, the recesses 41 have a cross section of a circle segment. In an at present preferred embodiment the radius of curvature of the cross section is approximately 2,5 mm, but of course the radius can vary in a wide range depending on the type and size of fillets and the accompanying bones.

It is essential that there be a very sharp edge along the joining line between the envelope surface 42 and the inner surface 44 of the recess 41. The provision of a sharp edge is essential for the following reason.

Figure 10:
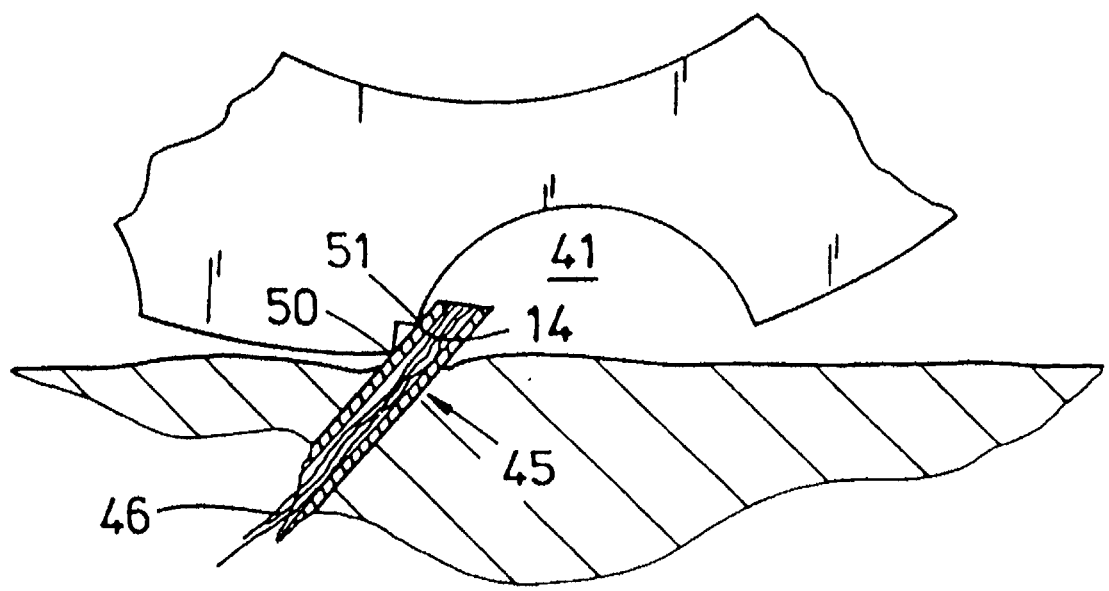
FIG. 10 shows the action of the cylinder on a pin-bone during removal thereof.

In FIG. 10 is shown a fillet in cross section and a pin-bone 45. After filleting the pin-bone extends approximately 1 mm out from the meat, at the most. The pin-bone consists of a tube of relatively hard material, and in the tube nerve strings 46 run. If the cylinder 40 is to successfully grasp the pin-bone 45, the edge of the recess 41 has to be able to cut in the hard material and create a small notch 14 therein, whereby the bone can be pulled up to the nip between the cylinder 40 and the tounge of the device.

In another still more preferred embodiment of the invention there is provided a step-like formation 47 at the edge 49 joining the inner surface 48 of a recess and the cylinder's envelope surface 43.

Figure 8:
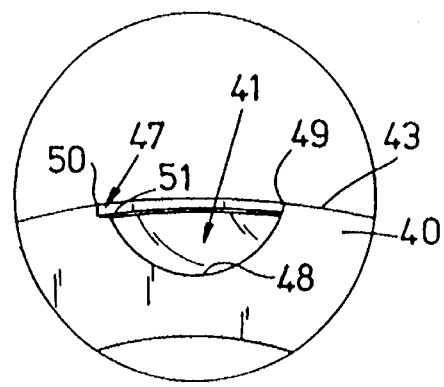
FIG. 8 is an enlarged view of the encircled part in FIG. 7, showing one recess with its step-like formation.

In FIG. 8 the step 47 is shown in detail. As can be seen in the figure, by creating the step 47, e.g. by milling, there is provided two relatively sharp edges 50 and 51 respectively. The radius of curvature of each edge 50, 51 is preferably 0,1 mm. If the edges are sharper, the pin bones will be cut off instead of pulled out. Such radius is achieved by glass blasting of the cylinder 40 after milling. The provision of two edges enhances the ability to create a firm grip on the pin-bones. It turns out that the efficiency is greatly enhanced by this feature.

It is conceivable to provide more than two edges 50, 51, e.g. for very large fish fillets such as tuna fillets, where the bones may be significantly larger.

Both sides of the recesses 41 may be provided with steps 47 and edges 50, 51, to make it possible to rotate the cylinder in both directions. Thus one can mount the cylinder from both ends, thereby doubling the effective life of the cylinder.

Figure 5:
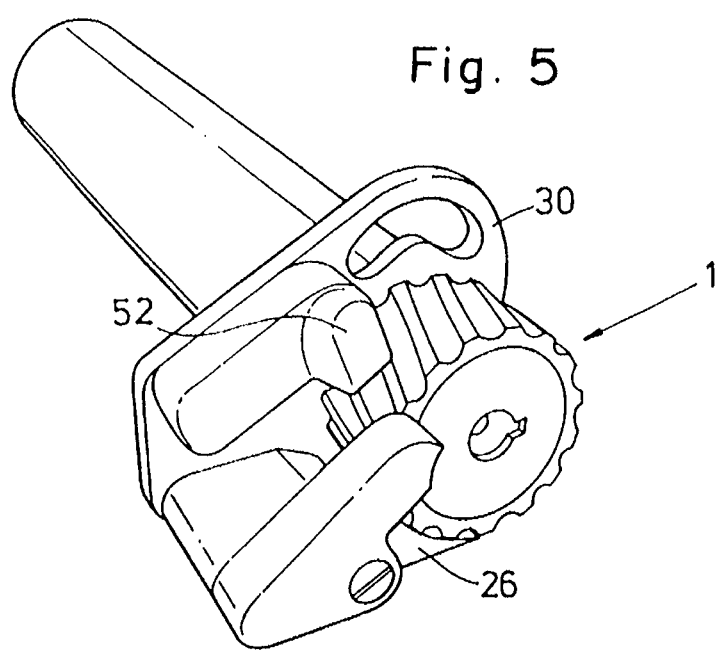
FIG. 5 is a perspective view of the device according to one aspect of the invention, provided with the improved cylinder according to a further aspect of the present invention.
Figure 6:
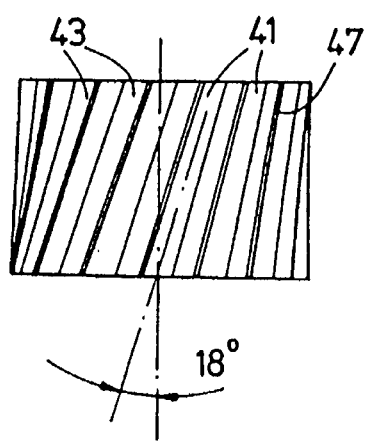
FIG. 6 is a top view of the cylinder showing the recesses forming an angle with respect to the longitudinal axis of the cylinder.

In order to more efficiently remove traces of meat residues, the prior art device is improved by providing nozzles 52 (FIG. 5) for spraying water onto the cylinder and in the recesses. In a preferred embodiment there are three nozzles provided. The nozzle is made of e.g. DELRIN (trade mark) and attached to the mounting plate 30 and positioned above the cylinder. A tube connection is located on the opposite side of the mounting plate. A bore through the mounting plate conveys water to the nozzle.

By providing such water spraying, the device is kept extremely clean, and a positive and unexpected side effect is that the water acts as a lubricant, so that the surface of the fillet becomes even less affected mechanically when the device is moved over the fillet. The meat will not be "gripped" by the nip between cylinder and tounge, yhus eliminating surface deterioration, and in addition thereto the surface of the meat will not dry out.

The water is supplied through nozzles, preferably three, and at a rate of about 100 ml/min, in conventional use.

I claim:

1. An apparatus for removing bones from meat, e.g. fishbones from fish meat, or quills from poultry, comprising a handle (28), a rotatably driven element (22) arranged at an end of said handle (28), and provided with engagement means (23), a counterpressure element (26) to provide a nip between said counterpressure element (26) and the rotatably driven element (22), said rotatably driven element (22) being mounted axially on a drive shaft (29), extending out of said handle (28), for driving the element (22), characterized by a mounting plate (30) attached to the handle (28), an opening in said mounting plate whereby the drive shaft (29) runs through said mounting plate (30), and counterpressure element (26) is mounted on the mounting plate (30).

2. The device as claimed in claim 1, wherein said counter pressure element (26) is provided with a lip (27), bearing against the rotatably driven element (22), at least with one edge (27b).

3. The device as claimed in claim 2, wherein the lip (27) of the counter pressure element is given a radius of curvature which is slightly larger than the radius of curvature of the element (22), whereby the lip (27) extends into a flat surface running away from the surface of the cylinder, thereby creating an essentially wedgeformed gap between the counter pressure element (26) and the cylinder surface.

4. The device as claimed in claim 3, wherein the front edge (27b) of the lip is provided with a flat upper side and bevelled at an angle with respect to the horizontal plane, and wherein its lower side is rounded off.

5. The device as claimed in claim 1, wherein the counter pressure element (26) is resiliently mounted on two pins (25a, 25b), whereby the resilient action is achieved by means of O-rings (32), in that the diameter of the pins (25a, 25b) is sligthly smaller than the holes in the counter pressure element in which the pins are inserted, and in that the O-rings fit in said holes by means of tight fit.

6. The device as claimed in claim 1, comprising a locking plate (34) fixing both the counter pressure element (26) and the cylinder (22) in position.

7. The device as claimed in claim 1, comprising a scraping means (35, 36) arranged to scrape off meat residues which have accompanied the bones and got stuck on the cylinder (22).

8. The device as claimed in claim 1, modified in that the counter pressure element is removed, and in that the rotatably driven element (22) is provided with a set of saw blades, whereby the device is useful for achieving scores in pork buttocks.

9. A cylinder (40) for a bone remover, characterized in that said cylinder is provided with a plurality of recesses (41) running across its envelope surface, substantially in its longitudinal direction, each of said recesses (41) having at least one sharp (50; 51) edge formed along the joining line between the envelope surface and the inner surface of the recess (41) with the radius of curvature of the edges being about 0.1 mm; and in that steps are provided on both sides of each recess.

10. The cylinder as claimed in claim 9, comprising a step-like formation (47) provided along the joining line between the envelope surface and the inner surface of the recess, for providing two sharp edges (50, 51).

11. An apparatus for removing bones from meat, e.g. fishbones from fish meat, or quills from poultry, comprising a cylinder as claimed in claim 9.

* * * * *